(12) United States Patent
Elliott

(10) Patent No.: US 7,023,818 B1
(45) Date of Patent: Apr. 4, 2006

(54) SENDING MESSAGES TO RADIO-SILENT NODES IN AD-HOC WIRELESS NETWORKS

(75) Inventor: Brig Barnum Elliott, Arlington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 1178 days.

(21) Appl. No.: 09/627,083

(22) Filed: Jul. 27, 2000

(51) Int. Cl.
*H04Q 7/24* (2006.01)

(52) U.S. Cl. ...................................... 370/328; 370/338

(58) Field of Classification Search .............. 455/445, 455/404.2; 370/328, 338
See application file for complete search history.

(56) References Cited

U.S. PATENT DOCUMENTS

| | | | | |
|---|---|---|---|---|
| 4,718,002 | A | 1/1988 | Carr .......................... | 364/200 |
| 5,243,592 | A | 9/1993 | Perlman et al. ............... | 370/17 |
| 5,850,592 | A | 12/1998 | Ramanathan ................... | 455/7 |
| 5,881,246 | A | 3/1999 | Crawley et al. ....... | 395/200.68 |
| 5,913,921 | A | 6/1999 | Tosey et al. ................. | 709/220 |
| 6,028,857 | A | 2/2000 | Poor .......................... | 370/351 |
| 6,125,279 | A * | 9/2000 | Hyziak et al. ............... | 455/445 |
| 6,304,556 | B1 * | 10/2001 | Haas .......................... | 370/254 |
| 6,721,290 | B1 * | 4/2004 | Kondylis et al. ........... | 370/329 |
| 6,728,777 | B1 * | 4/2004 | Lee et al. .................... | 709/238 |
| 6,748,233 | B1 * | 6/2004 | Arnold et al. ............... | 455/522 |
| 6,816,460 | B1 * | 11/2004 | Ahmed et al. ............... | 370/238 |

OTHER PUBLICATIONS

"Link-State Routing," John Moy, Ch. 5, from "Routing in Communications Networks," ed. Martha Steenstrup, Prentice Hall, 1995.

"Packet Radio Routing," Gregory S. Lauer, Ch. 11, from "Routing in Communications Networks," ed. Martha Steenstrup, Prentice Hall, 1995.

"The Organization of Computer Resources Into a Packet Radio Network," R.E. Kahn, IEEE Trans. On Communications, vol. COM-25, No. 1, Jan. 1977, pp. 169-178.

"Multicast Networking and Applications," C.K. Miller, Ch. 1, 3, and 8, Addison-Wesley, 1999.

"Analysis of Routing Strategies for Packet Radio Networks," J.J. Garcia Lune Aceves et al., Proc., Of the IEEE INFOCOM '85, Washington, DC, Mar. 1985, 292-302.

(Continued)

*Primary Examiner*—Huy D. Vu
*Assistant Examiner*—Daniel Ryman
(74) *Attorney, Agent, or Firm*—Fish & Neave IP Group Ropes & Gray LLP

(57) ABSTRACT

A method and apparatus (2, 20) are provided for transmitting a message from a first node (A) to a radio-silent node (S) in a network. The network includes a plurality of nodes. A location area corresponding to the radio-silent node (S) is determined. A set of nearby routers ($Z_0$–$Z_{10}$) within the location area is identified. The message is transmitted from the first node (A) to the set of nearby routers ($Z_0$–$Z_{10}$). Each router of the set of nearby routers ($Z_0$–$Z_{10}$) that receives the message retransmits the message for the radio-silent node (S).

31 Claims, 8 Drawing Sheets

OTHER PUBLICATIONS

"The DARPA Packet Radio Network Protocols," J. Jubin et al., Proc. Of the IEEE, vol. 75, No. 1, Jan. 1987, pp. 21-32.

"Routing Algorithm Issues," Radia Perlman, Ch. 9, from "Interconnections: Bridges and Routers," Addison-Wesley Publishing Company, Inc., 1992.

"Packet Radio Network Routing Algorithms: A Survey," J. Hahn and D. Stolle, IEEE Communications Magazine, vol. 22, No. 11, Nov. 1984, pp. 41-47.

"Introduction to Radio Propagation for Fixed and Mobile Communications," J. Doble, Artech House, Inc., 1996, Ch. 8-11.

"Radiowave Propagation," M.P.M. Hall and L.W. Barclay, Ed., Peter Peregrinus Ltd., London, U.K., 1989, Ch. 1 and 15.

"Antennas and Radiowave Propagation," R.E. Collin, McGraw-Hill, 1985, Ch. 6.

* cited by examiner

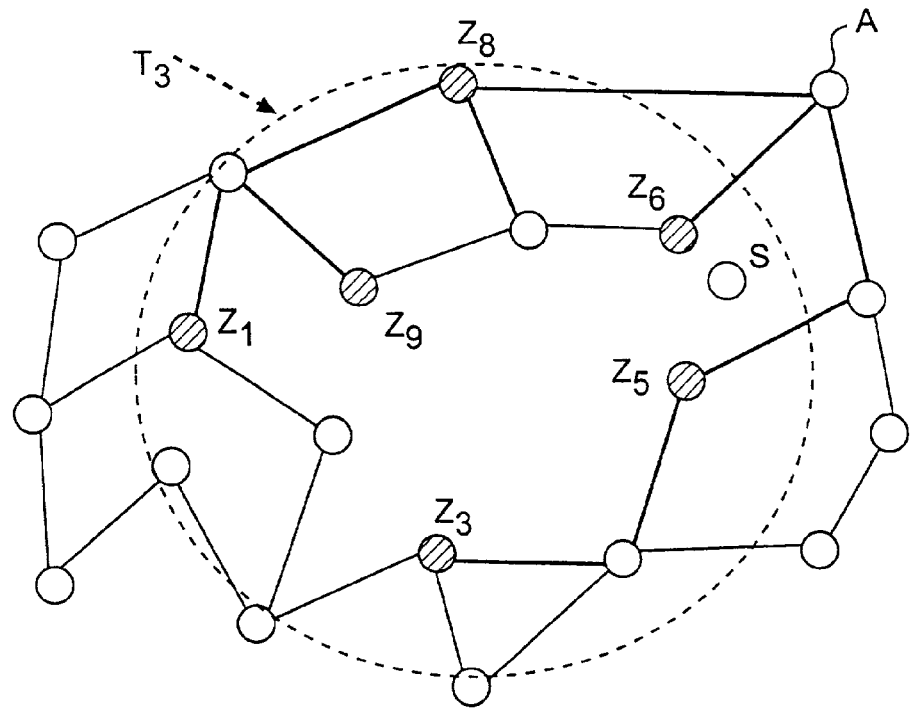
FIG. 10
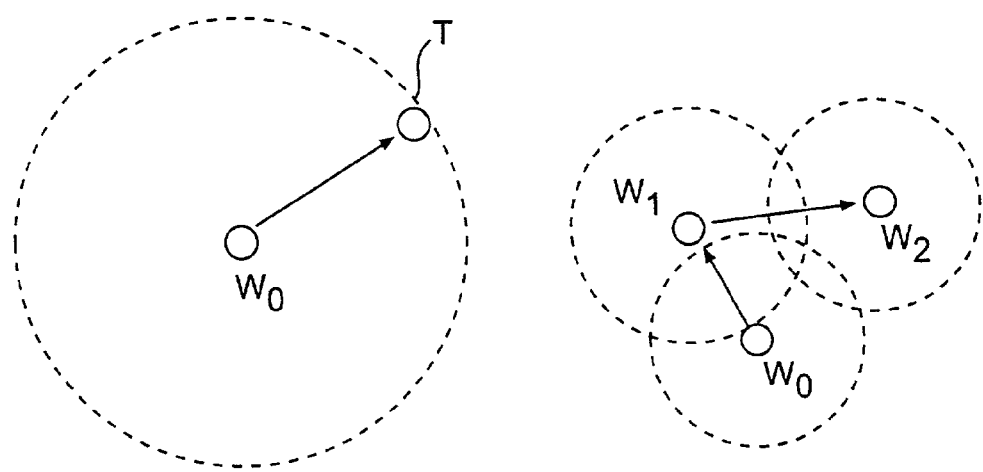
FIG. 11a  FIG. 11b

SENDING MESSAGES TO RADIO-SILENT NODES IN AD-HOC WIRELESS NETWORKS

BACKGROUND OF THE INVENTION

1. Field of the Invention

The present invention relates generally to network communications, such as communications in wireless ad-hoc networks. More particularly, the present invention relates to a method, system and apparatus for transmitting messages to radio-silent nodes in a wireless network.

2. Related Art

In wireless ad-hoc networks, all network nodes are preferably equipped with communications transceivers. At least some of these nodes are capable of network routing functions ("routers"); other nodes are sources or destinations for data traffic ("endpoints"). Preferably, all nodes in an ad-hoc network execute a set of known algorithms, and perform a set of known networking protocols. As will be appreciated by those skilled in the art, these algorithms and protocols enable the nodes to find each other, determine paths through the network for data traffic from source to destination(s), and detect and repair ruptures in the network as nodes move, as they fail, as battery power changes, as communications path characteristics change over time, and so forth. Wireless ad-hoc networks do not rely on immobile base stations or other fixed infrastructure. Accordingly, ad-hoc networks are important in military, emergency, mobile and temporary environments (e.g., business meetings, campaign headquarters, and so forth).

FIG. 1a illustrates an example of a wireless ad-hoc network. In FIG. 1a, the circles represent nodes in the network. The solid lines between nodes represent "neighbor relations," e.g., a communications link connecting two nodes that are capable of forwarding messages ("traffic") between one another. A given node such as node X has a limit to its communications range (e.g., a radio range or other wireless communications range, such as infrared or laser). A communications range limit for node X is illustrated in FIG. 1a as a dashed circle. In practice, a communications range does not necessarily have, and indeed seldom will have, have a circular pattern or shape. As will be appreciated by one skilled in the art, the actual shape depends on the terrain, propagation patterns, reflections from nearby buildings and/or vehicles, and so forth. FIG. 1a also shows node X's actual neighbors (nodes $A_1$ through $A_3$) and potential neighbors ($P_1$ through $P_3$). Actual neighbors are nodes with whom node X has a communications link or other neighbor relations. Potential neighbors are nodes within X's transmission range that could be used for forwarding messages, but which are not currently being so used.

Other forms of ad-hoc wireless networks simplify routing and minimize routing traffic by organizing nodes (e.g., network members) into hierarchical groups called clusters, with each cluster having a cluster head. A cluster may include a single cluster head and zero or more cluster members. A cluster head serves as a router for affiliated cluster members. Cluster head stations communicate with each other to form a network backbone, and cluster member stations relay messages to the network through affiliated cluster heads. In mobile systems, cluster members move into and out of clusters depending on their physical location and radio connectivity. An example of this type of mobile communications network is shown in FIG. 1b, in which areas 1a, 1b and 1c represent individual clusters. In FIG. 1b, a double-circle indicates a cluster head ("CH"), whereas a single circle indicates a cluster member ("CM"). In the FIG. 1b example, CM2 and CM3 are affiliated with a cluster headed by CH1, and CM6 and CM7 are affiliated with a cluster headed by CH5. CH4 is the head of its own cluster and does not have any affiliated cluster members.

Another example of a mobile communications network is disclosed in U.S. Pat. No. 5,850,592, issued to S. Ramanathan on Dec. 15, 1998, and assigned to the same assignee of the present application. The U.S. Pat. No. 5,850,592 patent discloses a method for a plurality of mobile stations to automatically organize themselves into a hierarchical network, in which some of the stations operate as message gateways for a cluster of mobile stations. Initially, mobile stations search for available cluster heads and initiate an affiliation procedure to establish themselves as cluster members. If the affiliation procedure is successful, a mobile station operates as a cluster member. Otherwise, a mobile station promotes itself to operate as a cluster head.

In the arrangement of the U.S. Pat. No. 5,850,592 patent, each station operates in at least two basic modes. In the first mode, the mobile station serves as a message gateway or router for a cluster of other member stations. The second mode allows the mobile station to operate as a non-gateway (or "cluster member") station. Each mobile station determines which out of the two modes to operate in, as discussed above. The mobile stations disclosed in the U.S. Pat. No. 5,850,592 patent can operate at two different power levels. When there are no other available cluster heads, a mobile station operates as a cluster head, and transmits at a relatively high power level for communication among other cluster head stations. Although a cluster head communicates at a higher power level with other cluster heads, a cluster head can still communicate with its cluster members using a relatively lower power level.

Nodes in ad-hoc networks employ known routing techniques to accomplish their routing requirements. For example, "link-state" routing is one well-known routing mechanism. In a link-state routing system, each router preferably maintains a link-state database. The database maintains a picture, or dynamic map, of the network including various connections, members, components, etc. Routers generate forwarding or routing tables to direct routing traffic through the network based on information contained in the database. Each router (and/or endpoint) preferably generates updates to the link-state database. An update can contain information regarding a router's neighbors, potential neighbors, link metric data (e.g., a "cost" of transmissions or links), affiliated nodes, network conditions, partition information, etc. A known "flooding" procedure is used to distribute (e.g., flood) these updates throughout the network. One known flooding algorithm is discussed in Chapter 5 of "Routing in Communications Networks," M. Steenstrup, ed., 1995. Of course, there are many other known flooding procedures.

One example of a link-state routing approach is discussed in U.S. Pat. No. 6,028,857, issued to R. Poor on Feb. 22, 2000, and assigned to the Massachusetts Institute of Technology. According to the U.S. Pat. No. 6,028,857 patent, in a "link-state" routing approach, each network node maintains a routing table (or database) that specifies an "optimal" path toward each network destination. In the U.S. Pat. No. 6,028,857 patent, the term "optimal" is used to generally mean the shortest path, but may account for other factors such as load balancing. As will be appreciated by those skilled in the art, a shortest-path calculation can be performed via a shortest-path first algorithm, for example, Dijkstra's algorithm as explained in Chapter 5 of "Routing in Communications Networks," M. Steenstrup, ed., 1995.

As discussed in the U.S. Pat. No. 6,028,857 patent, when a node in a link-state routing system transmits a message to a destination node, it first fetches from a routing table an entry for the specified destination. The routing table entry specifies which neighbor of an originating node should relay the message and the identification of that neighbor is installed in a message header as the recipient. The originating node then transmits the message. Many of the originating node's nearby neighbors receive the message, since radio frequency ("RF") transmissions are essentially omni-directional. However, of all the neighbors that receive the transmission, only the specified recipient acts on the message. The recipient relays the message in the same manner, according to an entry in its routing table corresponding to the destination node. This process continues until the message reaches its ultimate destination. The nodes discussed in the U.S. Pat. No. 6,028,857 patent do not, however, maintain these types of routing tables, but rather maintain "cost tables" that indicate the costs of transmission to other nodes in the network.

Multicast forwarding and routing procedures are also well known in the communication arts. As will be appreciated by those skilled in the art, in a multicast routing scheme, a message (or packet) is routed from a source node to a well-defined group of destination nodes. Typically, an originating source node constructs a routing tree between itself and the group members. Extraneous tree branches are pruned to ensure that packets are not routed further than they need to be.

As will be appreciated by those skilled in the art, the Internet Engineering Task Force (IETF) has established standards for the well-known Internet multicast routing protocols such as Multicast Open Shortest Path First (MO-SPF), Distance Vector Multicast Routing Protocol (DVMRP), Protocol Independent Multicast—Sparse Mode (PIM-SM), and Protocol Independent Multicast—Dense Mode (PIM-DM). Similarly, additional types of multicast routing schemes, sometimes known as point-to-multi-point, are accommodated by the well known ATM routing protocol "Private Network to Network Interface" (PNNI) as codified by the ATM Forum. Because multicast routing is well known in the art, it will not now be described in further detail. However, further reference regarding multicast routing schemes may be had to Chapter 5 of "Routing in Communications Networks," M. Steenstrup, ed., 1995; Chapter 9 of "Interconnections: Bridges and Routers," R. Perlman, 1992; and Chapters 1, 3 and 8 of "Multicast Networking and Applications," C. K. Miller 1999.

As will also be understood by those skilled in the art, there are many other known procedures for routing messages over a network, even when a configuration of the network may change, and many procedures for measuring or rating the connectivity of a network in a particular configuration, all of which are well known in the art. Because these techniques are known in the art, they will not now be described in further detail. However, reference may be had to the following technical articles: "Packet Radio Routing," by Gregory S. Lauer in Chapter 11 of "Routing in Communication Networks," ed. Martha E. Steenstrup, Prentice-Hall 1995; "Packet Radio Network Routing Algorithms: A Survey," by J. Hahn and D. Stolle, IEEE Communications Magazine, Vol. 22, No. 11, November 1984, pp. 41–47; "The Organization of Computer Resources into a Packet Radio Network," by R. E. Kahn, IEEE Trans. on Communications, Vol. COM-25, No. 1, January 1977, pp. 169–178; "Analysis of Routing Strategies for Packet Radio Networks," J. Garcia Luna Aceves and N. Shacham, Proc. of the IEEE INFOCOM '85, Washington, D.C., March 1985, 292–302; and "The DARPA Packet Radio Network Protocols," by J. Jubin and J. Tornow, Proc. of the IEEE, Vol. 75, No. 1, January 1987, pp. 21–32. See also U.S. Pat. Nos. 4,718,002, 5,243,592, 5,850,592, 5,881,246, 5,913,921 and 6,028,857 for the general state of the art in wireless network message routing.

There are also many well-known techniques for determining radio transmission propagation patterns and models that will be appreciated by those skilled in the art. For example, RF propagation analysis can be accomplished by a number of known, industry-standard analytic models, including the CRC-Predict algorithm, the ITU Recommendation 370 Propagation Model, the Longley Rice Point-to-Point Propagation Model, the Lee Propagation Model, and so forth, for generating path loss and signal strength grids. Such models commonly support translation of digital terrain elevation data, as well as clutter and signal strength data, from radio frequency modeling systems. In addition, such models have been tested and measured to be accurate in spectrum allocation used by cellular, PCS, digital radio, and paging technologies. These models generally take digital terrain elevation data, spectrum usage, antenna characteristics, and foliage models as inputs, and produce estimates of RF pathloss as outputs. As such, the models can be used to estimate the amount of power needed to transmit from one geographic location to another along with estimates of the signal quality of the transmission as received at the destination radio. Because these techniques are well known in the art, they will not now be described in further detail. However, further reference regarding RF propagation modeling may be had to Chapters 8–11 of "Introduction to Radio Propagation for Fixed and Mobile Communications," by J. Doble, 1996; Chapters 1 and 15 of "Radiowave Propagation," M. P. M Hall ed., respectively by M. P. M. Hall and J. D. Parsons, 1989; and Chapter 6 of "Antennas and Radiowave Propagation," by R. E. Collin, 1985.

Some ad-hoc networks have nodes that occasionally enter radio silence. A "radio-silent" node can not or will not transmit information over any communications channel (e.g., RF, infrared, laser, etc.). Such radio-silent nodes are very common in tactical networks. A radio transmission in proximity to an enemy force might prove fatal, since it may be detected and give away the node's presence and location. Hence, a node may choose to become radio-silent when it is near an enemy. A radio-silent node can still receive messages from a network. At present, there are no procedures to route messages to such radio-silent nodes in ad-hoc networks. Thus, radio-silent nodes are essentially cut-off from their networks.

These types of problems are not adequately addressed in the art. Thus, there is a need to send messages to such radio-silent nodes with a high degree of reliability. There is a further need to integrate one or more radio-silent nodes into an ad-hoc wireless network, so that they can receive messages from other nodes in the network. There is a further need to estimate and/or determine a location area of a radio-silent node.

SUMMARY OF INVENTION

The present invention relates generally to sending messages to radio-silent nodes in ad-hoc wireless networks.

According to a first aspect of the invention, a communications router is provided for use in a communications network including a plurality of routers. The network has at least one radio-silent communications node that can receive messages. The communications router includes a transceiver to transmit and receive messages.

The communications router includes an electronic memory circuit with network information stored therein, and an electronic processor circuit. The electronic processor circuit (i) determines a location area corresponding to the radio-silent node, (ii) formulates a message for the radio-silent node, (iii) determines a set of routers located within the location area, and (iv) directs a transmission of the message to the set of routers for retransmission for the radio-silent node.

According to a first embodiment, a method of operating a first router of a plurality of routers is provided. The method applies to a communications system for communications among the plurality of routers in a network. The network has at least one radio-silent node that can receive messages. Each of the communication routers includes a transceiver to transmit and receive messages. The method includes the steps of: (i) determining a location area corresponding to the radio-silent node; (ii) formulating a message for the radio-silent node; (iii) determining a set of routers located within the location area of the radio-silent node; and (iv) directing the message to the set of routers for retransmission for the silent node.

According to still another embodiment, a method of estimating a location area of a radio-silent node in an ad-hoc network is provided. The network includes a plurality of nodes. The radio-silent node receives messages from the network. The method includes the steps of: (i) determining an initial position of the radio-silent node; and (ii) calculating a location area for the radio-silent node, the location area having a radius equal to a maximum velocity of the radio-silent node multiplied by an elapsed time since the radio-silent node was known to be at the initial location.

According to another embodiment, a method of transmitting a message from a first node to a radio-silent node in a network is provided. The network includes a plurality of nodes. The method includes the steps of determining a location area for the radio-silent node, identifying a set of nodes, and transmitting a message from the first node for distribution to the set nodes, wherein each node of the set of nodes that receives the message retransmits the message for the radio-silent node.

According to still another embodiment, a data structure stored on a computer readable medium is provided. The data structure includes a trajectory routing message for a communications node in a network having a plurality of nodes. The data structure includes an originating node identifier, a message sequence number, at least one waypoint, and a velocity indicator. The at least one waypoint includes a geographic identifier and at least one associated time. The velocity indicator is for the communications node.

In yet another embodiment, a method of formulating a trajectory routing message in a communications station that communicates among a plurality of similar stations in a network is provided. The method includes the steps of: (i) providing an originating node identifier and a message sequence number; (ii) providing a plurality of geographic location identifiers and at least one associated time for each identifier; and (iii) providing a velocity indicator associated with the communications station.

In still another embodiment, computer executable code stored on a computer readable medium is provided. The code is to operate a communications router in a network. The network has a plurality of routers and at least one radio-silent node capable of receiving messages. The computer executable code includes: (i) code to determine a location area of the radio-silent node; (ii) code to identify a set of routers within the location area; and (iii) code to transmit the message from the first node for distribution to the set of routers for retransmission for the silent node.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

FIG. 10 is a diagram illustrating multicast relaying via a subset of estimated nearby routers for a mobile silent node S.

FIG. 11a is a diagram illustrating a limit of an estimated location for a mobile silent node having an unknown trajectory and an initial position $W_0$.

FIG. 11b is a diagram illustrating limits of estimated locations for a mobile silent node have a planned trajectory including waypoints $W_0$, $W_1$ and $W_2$.

DETAILED DESCRIPTION OF THE PREFERRED EMBODIMENTS

The preferred embodiments will be described with respect to a mobile, wireless communications node (e.g., a router or communications station) and to a network formed by at least a plurality of similar mobile nodes.

Ad-hoc routers are specialized forms of network routers that contain one or more interfaces (e.g., RF, infrared, etc.). As will be appreciated by those skilled in the art, ad-hoc routers execute specialized routing protocols in order to discover other near-by routers, form neighbor relationships with those routers, and forward traffic messages through the network.

Figure 1A:
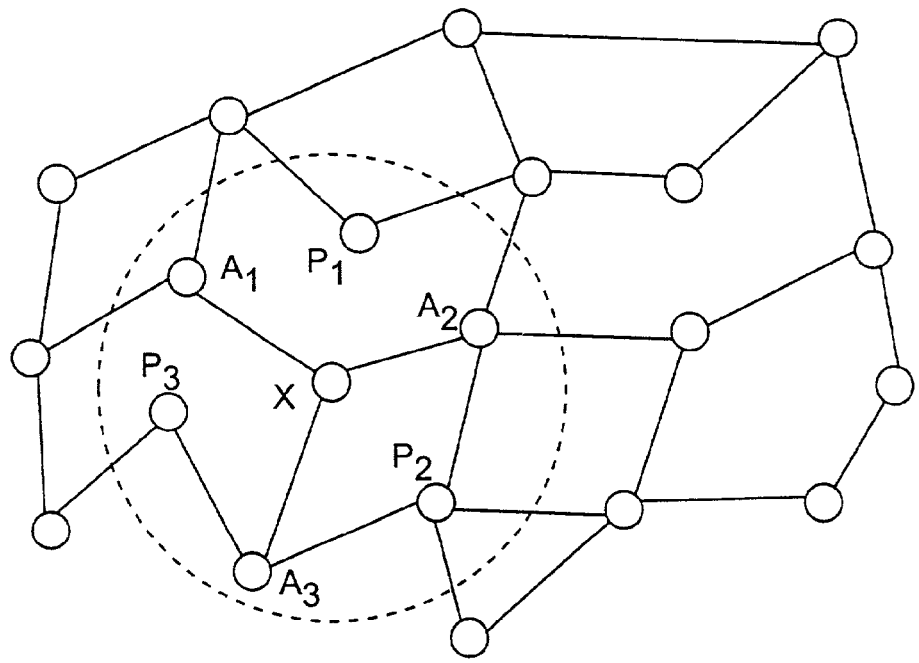
FIG. 1a is a diagram illustrating an ad-hoc network.
Figure 1B:
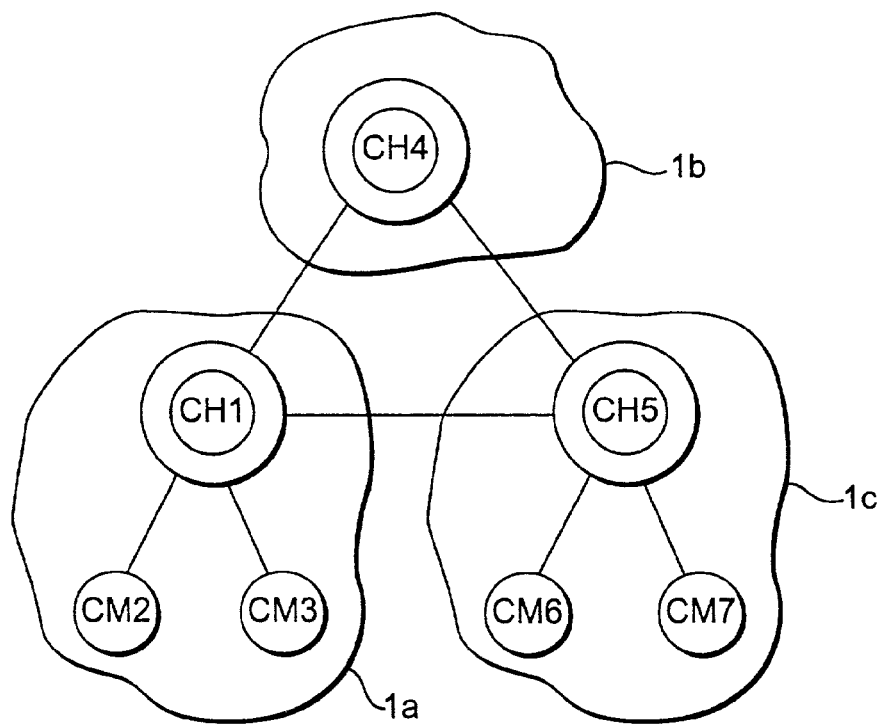
FIG. 1b is a diagram illustrating an ad-hoc network in which member nodes are arranged in clusters.
Figure 2A:
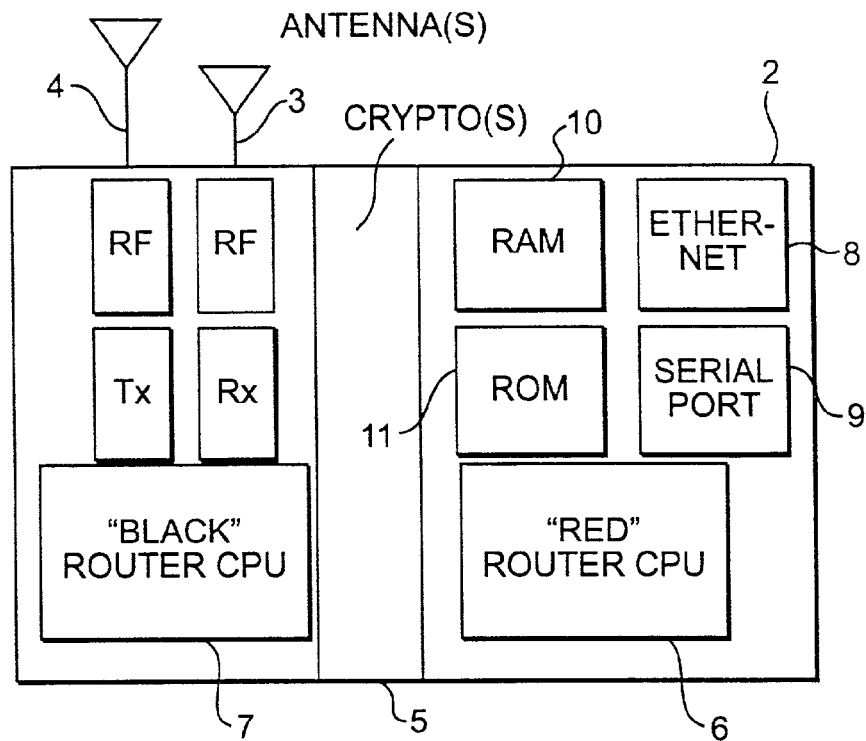
FIG. 2a is a block diagram illustrating an example architecture for a mobile communications router.

FIG. 2a shows a hardware architecture for a wireless communications node 2 (e.g., a router) for use in an ad-hoc wireless network. As illustrated, the node has two radio transceivers 3 and 4. The node also includes a cryptographic unit ("crypto") 5 that partitions the hardware into a red and black side. Each side preferably has a corresponding router CPU 6 and 7, respectively. The FIG. 2a hardware also has an Ethernet port 8 and a serial interface port 9, as well as memory such as RAM 10 and ROM 11.

As will be appreciated by those skilled in the art, the division of a router into a "red" and "black" side corresponds with established military communications security procedures. The "red" side contains unencrypted data, which in turns becomes encrypted as it passes through the crypto unit 5 on its way to the "black" side. This encrypted data can then be transmitted without any compromise to the contents of the message being transmitted, i.e., the message is encrypted so that it cannot be interpreted by by-standers who may overhear the transmission. Upon receipt at the destination radio, the message is again passed through the crypto unit 5 from a "black" to a "red" side and thus is properly decrypted so that the message contents can be inspected and manipulated. If desired, the crypto unit 5 can also provide additional features such as known digital signatures upon messages so as to authenticate the messages as coming from authorized radios. In general, known commercial radios omit the crypto and the "red/black" separation and thus pass their messages "in the clear" when transmitted over the air.

Figure 2B:
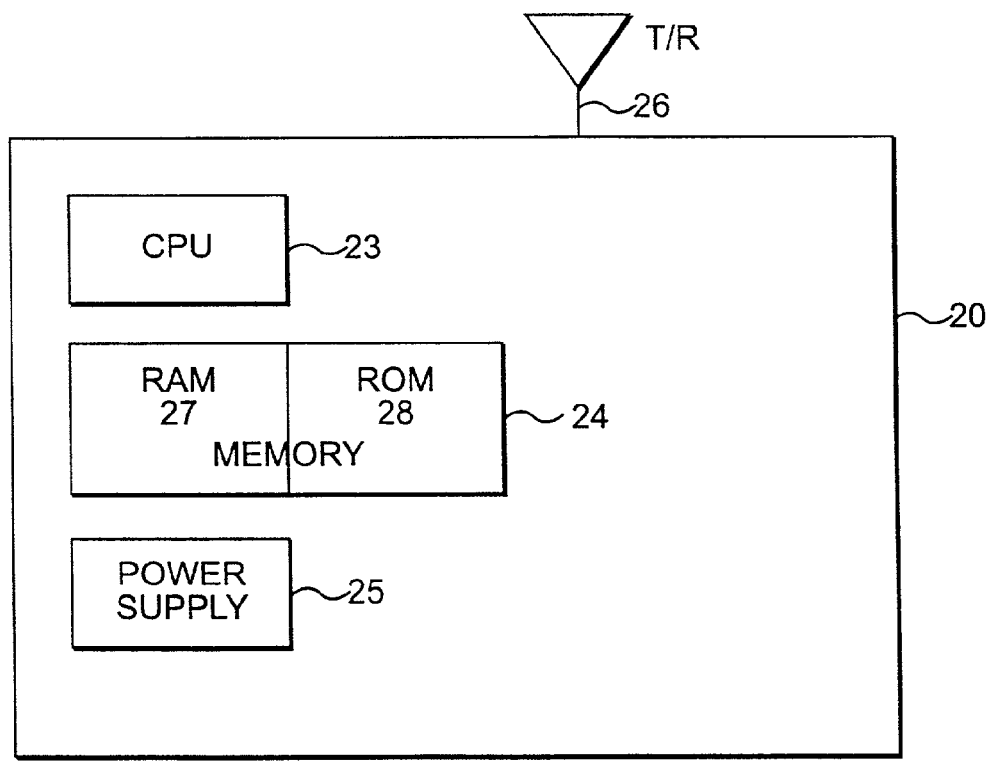
FIG. 2b is a block diagram illustrating another example architecture for a mobile communications router.

Another example architecture for a wireless communications node (e.g., a router) 20 is shown in FIG. 2b. The wireless node 20 preferably includes a central processing unit (CPU or other electronic processor circuit) 23, a memory (or an electronic memory circuit) 24, a power supply 25, a transceiver 26 (e.g., a transmitter and a receiver), RAM 27 and/or ROM 28. The memory 24, RAM 27 and ROM 28 are each suitable for storing computer executable software, data structures, data bases, and/or for storing various network routing updates and tables, for example. The transceiver 26 facilitates the transmission and reception of signals (e.g., RF and/or infrared signals) in a known manner. The wireless node 20 may include more than one transmitter and/or more than one receiver. Of course, the wireless node 20 can include other known signal processing and measurement components, data entry devices, routing and protocol software and modules, as well as other known communication and computing components. The wireless node 20 can also include an Ethernet interface, as well as other interfacing ports.

As will be appreciated, each of the illustrated CPUs execute computer executable software in a known manner. As such, the CPUs control the operation of a wireless node (or router) and implement the software, methods, procedures and logic of the present invention. With these arrangements, a wireless node communicates with other wireless nodes in a network. As will be appreciated by those skilled in the art, other known routing architectures may also be used with the present invention.

Each of the illustrated nodes may also be equipped with known positioning equipment, such as global positioning systems, triangulation equipment, inertial navigation, etc. The positioning equipment may be either internal to the node or attached to the node via an external connection, such as a serial interface or Ethernet. The positioning equipment preferably provides a geographic location of the node. A mobile node may also include known velocity measurement equipment, such as a speedometer, windspeed detector, water-speed detector, inertial navigation unit, and the like. This equipment preferably provides velocity information, such as current velocity, projected velocity and a maximum velocity for the mobile node. A node may also include a digital clock to provide a current time. The digital clock may be of any known construction and can be synchronized by a central beacon signal, for example.

Current geographical coordinates of a node and a velocity indicator (e.g., maximum, current, and/or projected velocity) can be included in messages from each network node. For example, this type of information may be included in a routine routing update messages from a node, and/or in data-carrying messages from the node. In addition, this information can be pre-planned and thus stored into the local memory for all nodes in the network before the nodes begin to function. Alternatively, the geographic location of network nodes could be deduced from external systems such as radar, radio-frequency tags and systems for locating such tags, etc. Accordingly, a network can know, at essentially all times, a current location and velocity indicator for each network node. Thus a node can go into radio silence without any prior notice and the remaining network nodes will still have some idea of where the now radio-silent node might be. Possessing this type information can be very useful in military situations, e.g., when an emergency arises and a node must immediately transition to radio silence.

There are a number of procedures in which a given node can determine that another network node has become radio-silent. One method is for the silence to be pre-planned, e.g., the silent node is known to be always silent, silent after a certain time, or silent under certain conditions. Such planned information can be stored as configuration information into a memory of some or all nodes in the network. Another procedure to detect radio-silent nodes is to track when nodes that have been planned to be in the network are no longer in communication with the network (e.g., when there is an unexpected lack of response from such nodes). These nodes can be posited to be radio-silent. As another procedure, a node may transmit a "last-second" message that indicates that it will imminently go into radio silence. As still another procedure, radio-silent information may be derived from external systems such as operator input based on visual observation, non-networked signals such as short RF bursts indicating a transition to radio silence, and so forth. Network routers preferably keep a list of silent nodes in local memory and implement the communication procedures for silent nodes discussed herein when a node is listed as radio silent. Alternatively, network nodes can circulate such radio-silent node lists in routine routing updates, for example.

Figure 3:
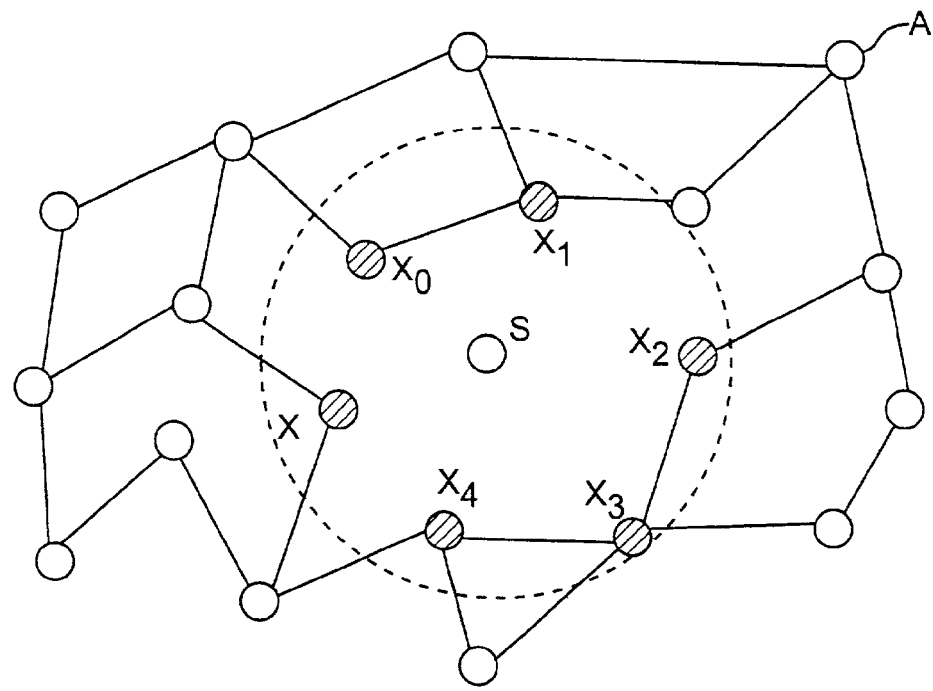
FIG. 3 is a diagram illustrating a silent node S in an ad-hoc network.

FIG. 3 illustrates a radio-silent node S in an ad-hoc network. Radio-silent node S is illustrated at the center of the network. The solid lines in FIG. 3 indicate neighbor relations between network nodes. Node S does not have any neighbor relations because it cannot or will not transmit during radio silence. A radio-silent node (during radio silence) does not operate as a router and is not part of a forwarding path for any messages through the network. However, node S can still receive messages that are transmitted within its reception range. The dashed circle in FIG. 3 represents a reception range for node S. Of course, the shape of this range may vary as discussed above.

If a silent node's location is known, a range over which it can transmit (if it activated its transmitter) can be estimated. This range gives an indication of the area from which it can receive messages (e.g., RF signals, infrared signals, etc.). Accordingly, the radio-silent node S may be able to receive transmissions from nodes within the dashed circle or zone (e.g., a "radio receive range") as shown in FIG. 3. In practice, a silent node may not always be able to receive message transmitted within the zone. Thus, it is more accurate to say that transmissions from nodes within this zone have a non-zero probability of being received at the silent node, while transmissions from nodes outside this zone have a zero probability of being received.

FIG. 3 further illustrates a number of "shaded" routers (X and $X_0$–$X_4$). Shaded routers X and $X_0$–$X_4$ are currently located within a "location area" in which estimated nearby neighbors are selected from. Hence, routers X and $X_0$–$X_4$ are "estimated nearby routers" of silent node S. In FIG. 3, the radio receive range is used to define the location area. In this case, when a silent node's location and some indication of its radio transmission range are known, and the locations of all non-silent routers in the network are also known, a set of nodes having a non-zero probability of having their transmissions being received at the silent node can be estimated. This set of nodes is the set of "estimated nearby routers."

A transmission range for a given node can be determined in a number of ways. One example is to make a "rough estimate," e.g., that such a node will in most situations be able to transmit no more than 20 kilometers. This estimate and corresponding area can then be stored in permanent configuration information in the network nodes' non-volatile memory. Another example measures actual radio (or other signal) ranges. For example, measuring a round trip time of RF signals between two nodes as the network operates. This information is used to determine maximal ranges at which communication can be effectively conducted. Yet another example is to perform a detailed analysis of RF propagation based on terrain and/or foliage models. Thus any given network node can have a priori estimates of the maximal communications range, measured experiential results, analytic results for a given terrain, or any combination of these methods, stored internally in the node's local memory.

Figure 4:
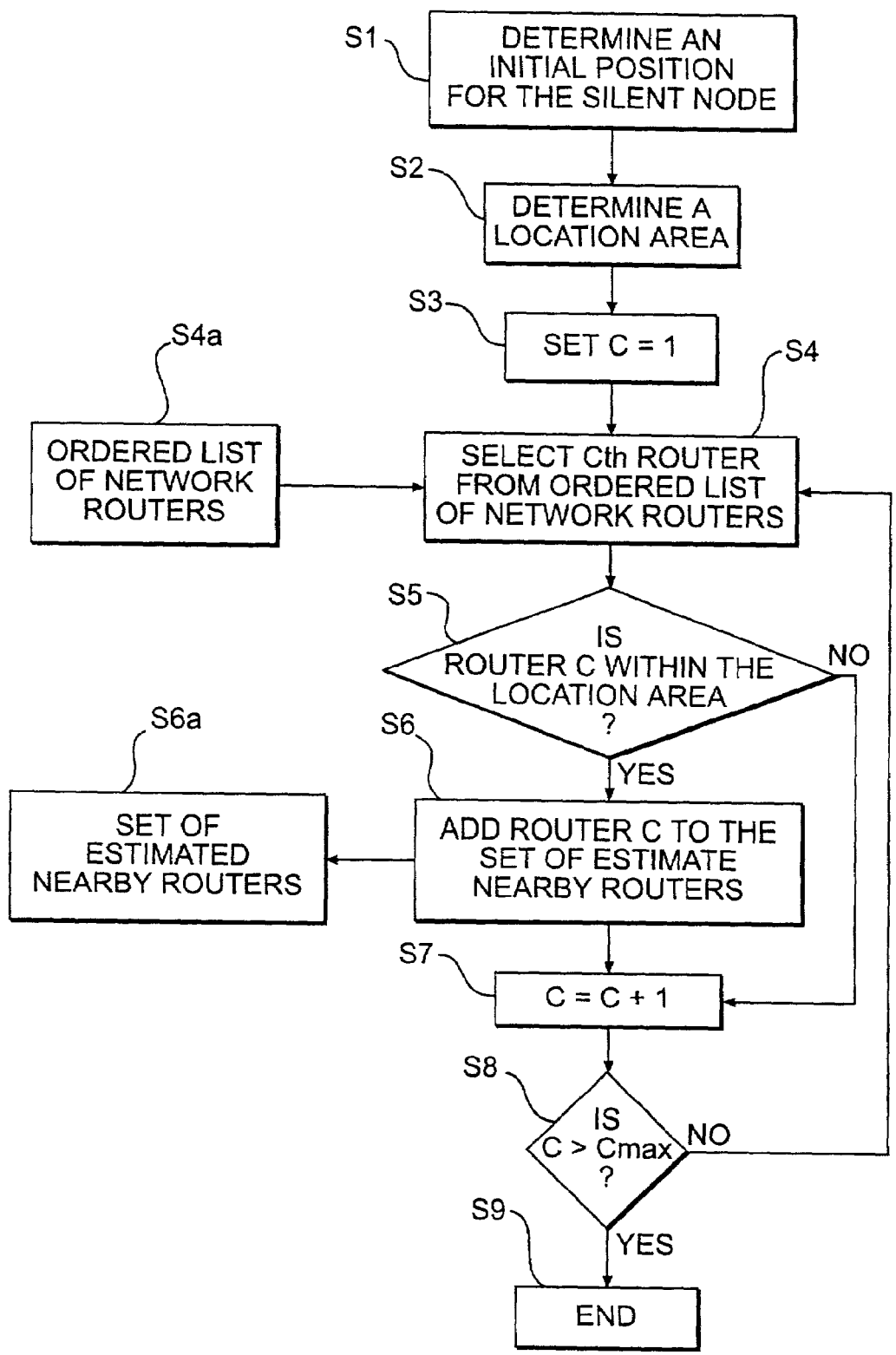
FIG. 4 is a flow diagram illustrating a procedure to determine a set of estimated nearby routers.

One procedure for determining a set of estimated nearby routers is discussed with reference to FIG. 4. A silent node's geographic location is determined (S1), e.g., from position information previously received from the now radio-silent node. A location area is then determined (S2). For example, this area can be defined by a radio receive range of the silent node, such as a circle centered on the silent node's location, with a radius equal to the nominal communications range for the wireless transmitter in the silent node. A counter C is initialized (e.g., "C=1") in step S3. A router C is selected (S4) from an ordered list (S4a) of network routers. The ordered list can be maintained in a database or other data structure. For a network router C, it is determined whether a current geographic position of the router C falls within the location area (S5). For example, the ordered list of routers could contain a recent geographic location for each listed router. The recent geographic location can be identified from routing updates of the network nodes, for example. Alternatively, the geographic location information can be maintained in a separate data structure. Router C is added (S6) to a set of estimated nearby routers (S6a) if it is in the location area. The set of estimated nearby routers is preferably maintained in a database or other data structure. The counter C is incremented in step S7. In step S8, it is determined whether all network nodes have been analyzed by comparing whether C is greater than Cmax (e.g., the maximum number of network nodes). If all network routers have been considered, the set of estimated nearby neighbors is complete and the procedure ends (S9). Otherwise, flow continues back to step S4 where a new router is analyzed.

Other techniques to determine the location area can also be employed. For example, the nominal transmission range could be derated to determine a smaller area (e.g., a circle) around a radio-silent node. A router's transmissions within this smaller area have a higher probability of being received by the silent node than transmissions made outside this smaller circle. Thus a derating technique can be used to produce a smaller set of routers, each of which has a higher probability of successfully transmitting a message to the radio-silent node. The same procedure as shown in FIG. 4 can be used to select the set of estimated nearby routers when using this location area procedure.

Another technique of determining the location area employs known RF propagation modeling techniques based on digital terrain information for the geographic area where network routers are being deployed. Such modeling techniques estimate RF propagation based on terrain features, buildings, foliage, interference, and so forth.

Radio propagation modeling provides a more accurate indication than does the "radio receive range" which preferably uses a circular region as described above. The same procedure as shown in FIG. 4 can be used to select the set of estimated nearby routers when using this location area procedure.

Figure 5:
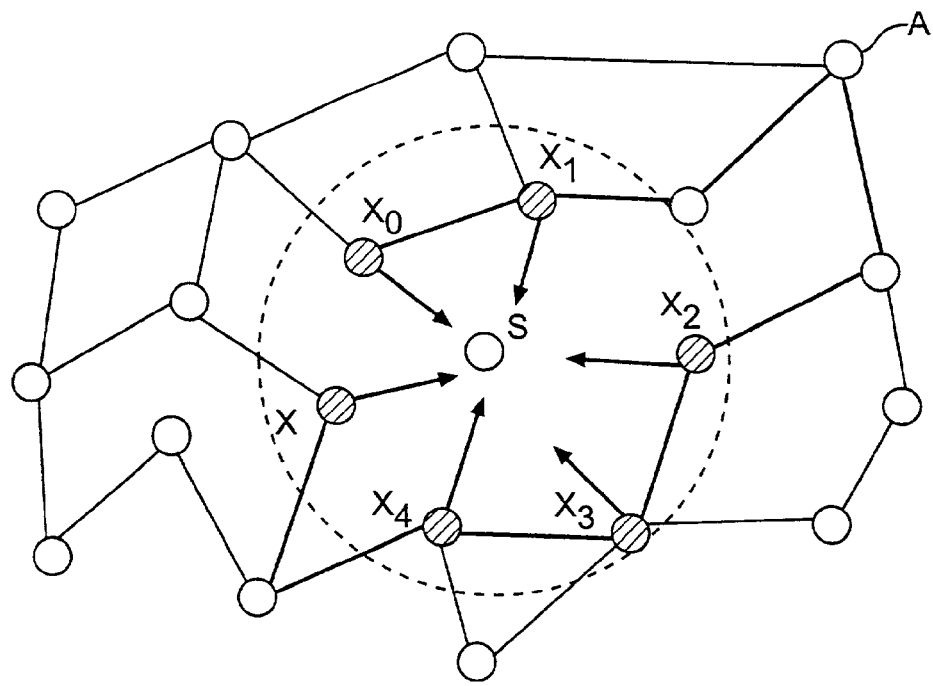
FIG. 5 is a diagram illustrating a multicast distribution of a data message to a silent node S, with relaying via estimated nearby routers.

Once a set of estimated nearby routers has been determined, a message can be routed for delivery to the radio-silent node S. FIG. 5 illustrates one technique for delivering a message to the radio-silent node S. In the FIG. 5 example, a source node A sends a message (e.g., a packet or a series of packets) toward the radio-silent node S. Source node A uses the set of estimated nearby routers as a multicast forwarding group. Source node A computes a multicast forwarding tree based on itself and each router of the set of estimated nearby routers (X and $X_0$–$X_4$). The source node A then sends the message via this multicast tree through known techniques for multicast forwarding. A copy of this message is preferably received at each of the estimated nearby routers (X and $X_0$–$X_4$) after some amount of time. Each estimated nearby router (X and $X_0$–$X_4$) that receives a copy of the message, preferably retransmits the message in hopes that the radio-silent node S will receive the transmission and thus obtain a copy of the message.

The estimated nearby routers can know to retransmit this type of message under several different methods. For example, estimated nearby routers may know to retransmit a message by prior arrangement. In such a case, any message with a given (multicast) address field will be retransmitted as a radio broadcast. Estimated nearby routers may also know to reroute (e.g., broadcast) the message based on the structure of the message that the estimated nearby routers receive. For example, the message may contain either a special multicast address or a list of node addresses, and this structure is only used for such retransmissions. There could also be a field within a message that indicates (via a setting of some value) that such a retransmission is needed.

There are generally two well-known categories of multicasting techniques: one is "sender based" and the other is "receiver based." The present invention accommodates either approach. As will be appreciated by those skilled in the art, in a sender-based scheme, the sender of a given message is responsible for determining the set of all recipients of the message. The present invention could employ a sender-based scheme by having a sender of a message include a list of all the recipient nodes' addresses as fields within the message being transmitted. As will also be appreciated by those skilled in the art, in a receiver-based scheme, each recipient node advertises that it wishes to join a particular multicast group. Then the sender need only send a message to this group and it will be distributed to all recipients in the group. As applied to the present invention, this scheme would require every recipient node to know that it is nearby a silent node and then join the appropriate multicast group for that silent node. As will be appreciated by those skilled in the art, this approach is merely a suitable systematic substitution of the "sender-based" techniques described in detail herein.

In general, if there are N estimated nearby routers, a silent node will receive somewhere between zero ("0") and N copies of the same message. The reception variation results from, for example, movement of routers within the network, interference, actual location of the silent node, etc. In a worst case, the silent node will "hear" (e.g., receive) zero ("0") transmissions. In a best case, the silent node will hear all N transmissions. In an alternative case, the silent node may hear some, but not all of the transmissions. This process of having N nearby estimated routers, where each transmits a separate copy of the same message, greatly increases the probability that a silent node will receive at least one copy of the message.

Figure 6:
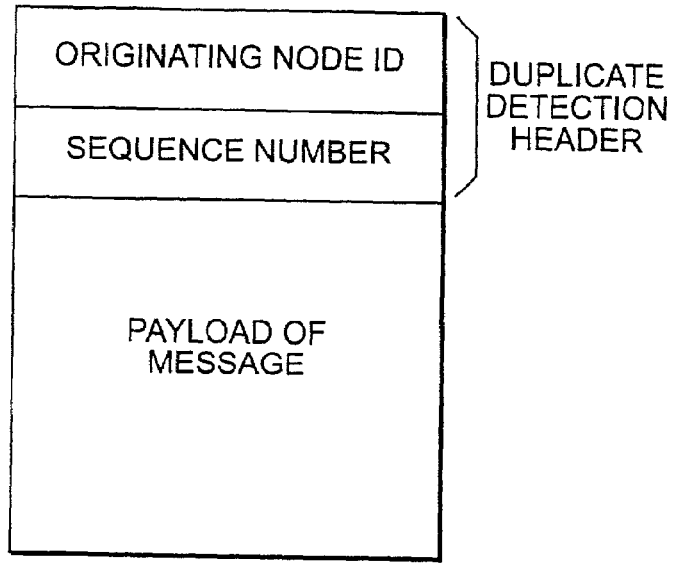
FIG. 6 is a diagram illustrating a format for a data message sent to a silent node.

To prevent the silent node from processing duplicate copies of the same message, each message is preferably tagged with a sequence number. The sequence number allows the silent node to determine if it receives duplicate copies of a message. Thus the silent node can ignore late-arriving duplicates of a message that it has already received. FIG. 6 illustrates a sample message format for messages (or signals) that are sent via multicast routing and then relayed through a set of estimated nearby routers to a silent node. As shown in FIG. 6, a duplicate detection header augments the normal contents of the data message (e.g., a message "payload"). The header preferably includes fields such as an originating node identifier and a sequence number.

Radio-silent nodes can use the FIG. 6 message format to detect and filter out duplicate messages. For example, when a source node formulates such a message, it puts its own node identification in the originating node ID field. The source node then increments an internal sequence number and inserts this new number into the sequence number field. Of course, the sequence number field can be configured so that it rarely, if ever, "wraps around" due to arithmetic overflow. Such a wrap around would force the source node to re-use previously used sequence number values. The combination of an originating node ID and a sequence number provides a network-wide unique identifier for this message. The source node then sends this message via multicast routing to the set of estimated nearby routers. Each of the estimated nearby routers in turn transmits (e.g., broadcasts through its transmitter) a copy of the message in hopes that the silent node will receive it.

A silent node preferably maintains an internal table (or other data structure) of all unique identifiers that it has received within some given time period (e.g., 10 minutes). A packet reception procedure for a silent node will be described with reference to the flow diagram illustrated in FIG. 7. When the silent node receives a message (S20), it determines whether the message header (e.g., the Duplicate Detection Header) on the received message has already been recorded in its memory (S21). If such an entry is already recorded in its memory, the silent node merely discards the duplicate copy (S22). Otherwise, the silent node records the fact that this network-wide unique identifier has been received, along with the time, and processes the message (S23). As will be appreciated by one skilled in the art, a background process may be employed to clear outdated (e.g., older than 10 minutes) identifiers from the database in order to free up memory.

The above-described location and routing procedures work particularly well when a silent node is not moving. However, as will be appreciated, a set of estimated nearby routers will typically change over time as a silent node moves throughout the network. Accordingly, transmitting messages to a mobile radio-silent node will now be considered.

Figure 8:
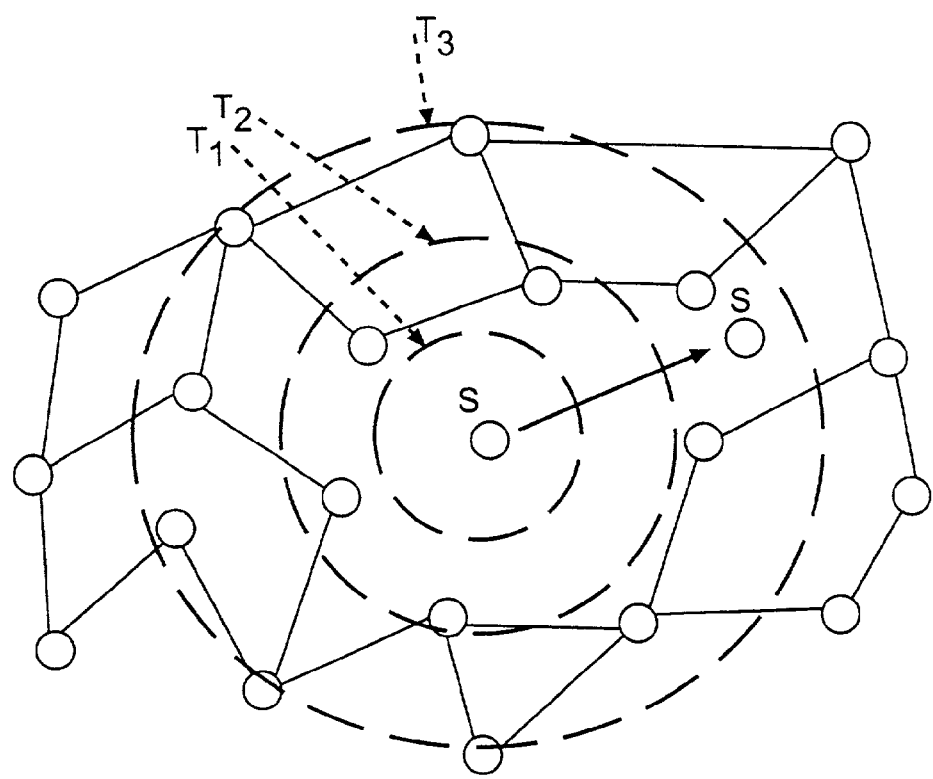
FIG. 8 is a diagram illustrating various limits of estimated locations of a silent node over time without trajectory information for the silent node.

FIG. 8 illustrates, with dashed circles at times $T_1$, $T_2$ and $T_3$, respectively, how limits of an estimated location area for a mobile silent node S changes over time when the network has no a priori information of where the silent node S might go. The network preferably has information regarding a starting point and a velocity for a silent node S. For example, this information can be preconfigured, or transmitted in routing updates prior to the node going silent. After that point, however, the silent node S may travel in any direction, speed up, slow down, zigzag, reverse its direction, and so forth. Still, the farthest the silent node can travel from its initial point is a straight line at a maximum velocity. A maximum radius of a location area (e.g., a circle) can then be defined by V*T, where V is the maximum velocity and T is the elapsed time since the node was known to be at its initial location. This radius defines a size of a location area for the mobile silent node S at a given time T. The location area grows larger as more time passes. The mobile silent node S potentially can be anywhere within the location area (e.g., circle as shown in FIG. 8).

Mobility models can be more complicated than a purely "circular" approach. For instance, estimates based on the underlying terrain, presence or absence of roads, known or predicted interference, and so forth, could be made. If such estimates are made, the estimated location area is constrained somewhat from a full circle since, for instance, vehicles must travel more slowly through sand than on roads, have trouble going up cliffs, and so forth. Nevertheless, the present invention is applicable to either a more or less-sophisticated procedure to analyze the limits of an estimated location area for a mobile silent node. However, as will be appreciated, a "circle" method is an easy-to-visualize case, and is also conservative because it accommodates a "worst possible case" scenario.

Figure 9:
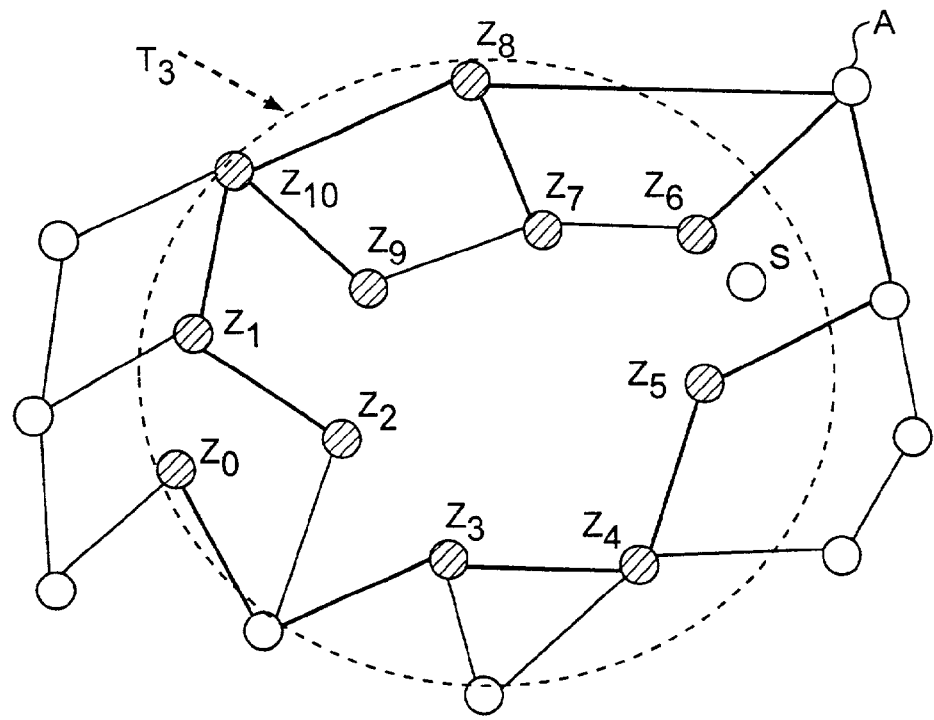
FIG. 9 is a diagram illustrating multicast relaying via estimated nearby routers for a mobile silent node S.

FIG. 9 illustrates an example of how the limits of an estimated location area (e.g., "Limits in Estimated Location") can be mapped onto or applied to the previously discussed approach for sending messages to a silent node. The Limits in Estimated Location represent an outermost boundary of an estimated location area of a silent node. The Limits in Estimated Location and the area that is bounded by the Limits (e.g., a location area) can be used interchangeably to define a location area for a silent node. This location area can be used to determine estimated nearby routers. One approach uses the Limits in Estimated Location at a time $T_3$ (e.g., $V*T_3$), instead of a radio receive range (or RF propagation model), to represent a location area. This approach, as shown in FIG. 9, uses all routers ($Z_0$–$Z_{10}$) within the limits of an estimated location area at time $T_3$ as a multicast routing group to forward messages for the radio-silent node S. These routers ($Z_0$–$Z_{10}$) are the set of estimated nearby routers, which can be identified using steps S3–S9 of FIG. 4, for example, once a location area is determined. The source node A then multicasts a message to each router in the set, as discussed above. This technique provides excellent coverage for a radio-silent node located near the center of the estimated location area. However, this technique may not provide adequate coverage for a radio-silent node that has moved close to the edge of the T3 limit, as shown in FIG. 9.

Another approach augments the Limits in Estimated Location with a received radio range so as to include both: i) the routers within the Limits in Estimated Location for a given time, and ii) a band (or area) of routers around the edges of the Limits. The thickness of this band is a radio receive range, or a derated radio range as described above. This combined location area is used as an location area to determine estimated nearby routers. For circular regions, this becomes a straightforward algorithm. For example, the two radii values (e.g., the Limits in Estimated Location and the radio receive range) are added to get a third value. This third value is used as the radius of a location area and a set of estimated nearby routers is determined, for example, as discussed above with respect to steps S3–S9 of FIG. 4.

FIG. 10 illustrates a routing procedure that uses a subset (e.g., one or more nodes) of an estimated nearby router set as the multicast routing group. A dashed circle in FIG. 10 represents the Limits in Estimated Location at the time T3. As shown, a subset ($Z_1$, $Z_3$, $Z_5$, $Z_6$, $Z_8$ and $Z_9$) of the FIG. 9 set of estimated nearby routers ($Z_0$–$Z_{10}$) is used as the multicast group.

There are many possible ways to select such subsets. As one example, the source node might select a random subset of the candidate routers. This technique would not guarantee coverage of the estimated area but would dramatically reduce the number of estimated nearby routers in cases of dense radio coverage without significantly lowering the probability of correct reception of the message at the radio-silent node. As another example, some nodes may be pre-selected as the subset of relay nodes and a table containing their identifiers might be stored into each node's nonvolatile memory. As yet another example, a minimal set of "covering" routers may be selected by iterating over the entire set of estimated nearby routers and repeatedly choosing a router that is not essential for covering a given area (i.e. a router which is providing only redundant coverage) and then deleting such routers. The remaining subset would still cover the estimated area. As still another example, a minimum subset of routers can be determined by examining every possible subset of the estimated nearby routers in turn, selecting only those subsets that cover the expected area, and then choosing the smallest subset from all such candidate subsets. There are advantages to only using a subset, for example, a subset reduces the overall number of transmissions used in order to deliver the message to a silent node. Such a scheme may also reduce the probability of self-interference caused by a number of different nodes transmitting at roughly the same time. As will be appreciated, however, using a subset does correspondingly reduce the probability that a silent node will actually get a copy of the message.

Discussion up to this point has been given with respect to mobility cases where a network has no advance knowledge of where a mobile silent node might travel. Often, however, a network will have some advanced knowledge. FIGS. 11a and 11b below illustrate how knowledge of a planned trajectory can allow the algorithms for routing to a silent node to have a finer control over an estimated location area when a mobile node is following a planned trajectory.

FIG. 11a illustrates a case where a mobile silent node initiates movement from a known initial position $W_0$ and proceeds at an unknown velocity. The resulting Limits in Estimated Location are shown as a dashed circle when the mobile silent node has traveled for a time T. In comparison, a planned trajectory of a mobile silent node is illustrated in FIG. 11b. The planned trajectory includes "waypoints" $W_0$–$W_2$ that can be advertised to the network. When network nodes know a series of waypoints that define a node's planned trajectory, together with a time at which that node plans to be at each waypoint, they then can compute finer-grained location area estimates for the silent node. The location area estimates are represented in FIG. 11b by three dashed circles centered respectively on waypoints $W_0$–$W_2$.

Figure 12:
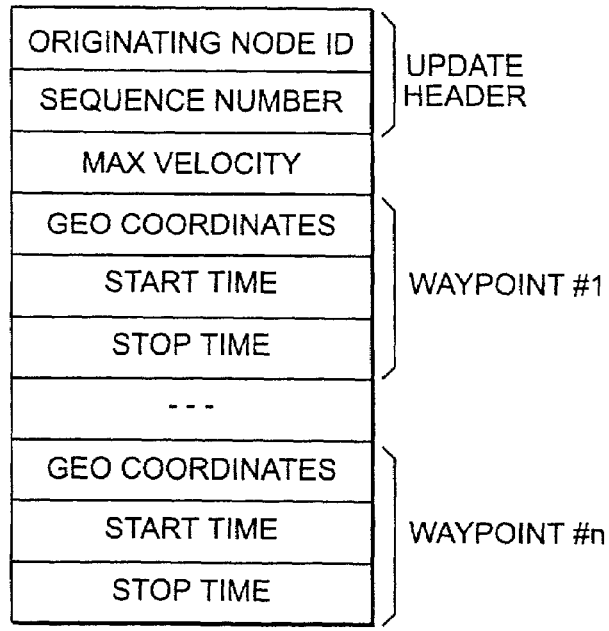
FIG. 12 is a diagram illustrating a format for a trajectory routing update message.

FIG. 12 illustrates a format for a trajectory routing update message that includes a series of waypoints for a node that is now, or may later, become a silent node. This type of message may be generated and then flooded through the network by each network node. Of course, a message having the below-described format can be readily stored on a computer readable medium using known programming techniques in view of this disclosure. The message format shown in FIG. 12 preferably includes an update header having an identification of the node to which the update pertains (e.g., an originating node id), and a sequence number so that newer updates can be distinguished from older ones.

Preferably, a trajectory message also includes the originating node's maximum velocity and a series of waypoint fields (e.g., Waypoints #1–n). The velocity field gives a maximum (or projected) velocity that can be achieved by the issuing node. The velocity can be measured in any convenient unit, such as meters-per-second, kilometers-per-hour, miles-per-hour, etc. The waypoints are preferably organized in chronological order. Each waypoint preferably includes a field that identifies a geographic location of the waypoint. Any convenient representation may be chosen, such as latitude/longitude or map grid coordinates, for example. Another waypoint field identifies a time at which the node expects to arrive at the respective waypoint (e.g., an "arrival" or "start" time). Another preferred waypoint field identifies an expected time to leave the respective waypoint (e.g., a "departure" or "stop" time).

Other dissemination techniques may be used to provide trajectory information, in addition to a moving node issuing its own trajectory messages. For example, certain network nodes may act as "proxies" for other nodes and issue trajectory messages on their behalf. As another example, a centralized server may issue trajectory messages for all nodes in the network. As another example, a set of distributed servers may issue trajectory messages. As yet another example, trajectory messages may be injected into the network by some device or system that is external to the network, such as an external radar system, external command and control system, and so forth.

In some cases, a trajectory message may not explicitly indicate where the mobile silent node expects to be when it is between waypoints. However, the amount of the time that the node will need for a traversal between waypoints can be determined. For example, the start time for Waypoint #2, minus the stop time for Waypoint #1 gives the total amount of time needed for the node to go from the first to the second waypoint. A Limits in Estimated Location between Waypoints #1 and #2 can then be calculated so that this traversal path is within the bounds of the Limits.

Figure 13:
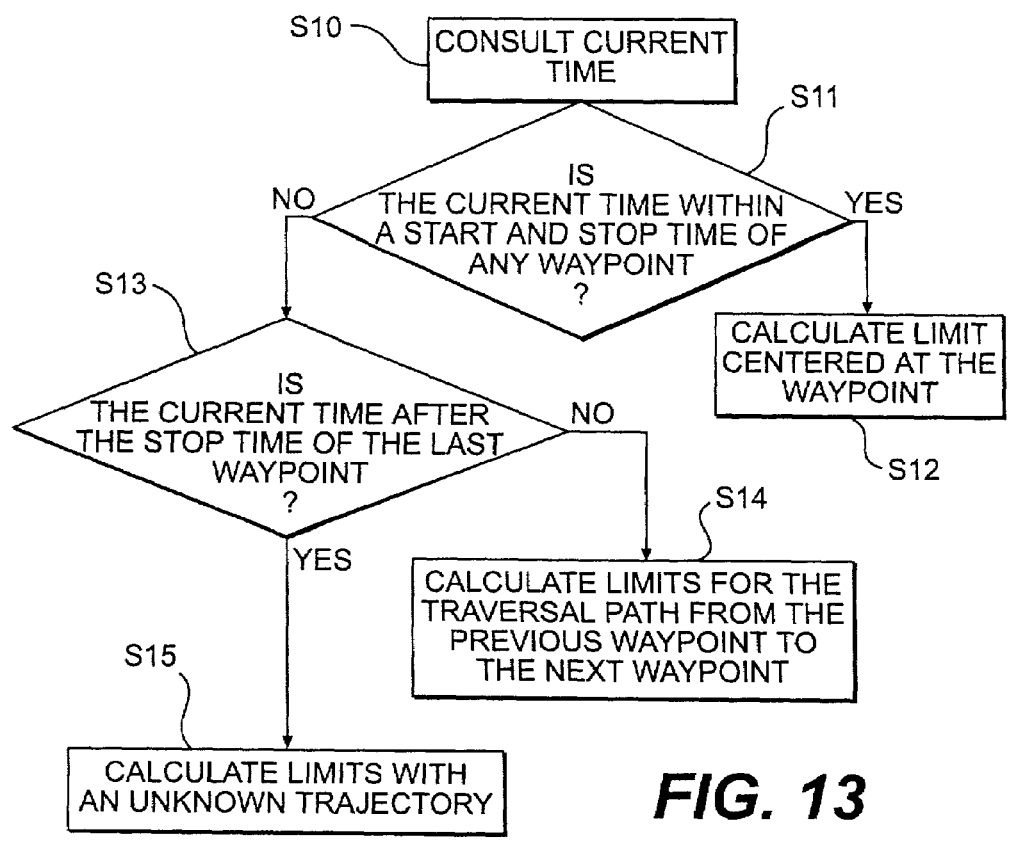
FIG. 13 is a flow-diagram illustrating a procedure to determine limits in estimated locations using available waypoints.

A procedure for determining the Limits in Estimated Location using available waypoints will be described with reference to FIG. 13. As discussed above, the Limits in Estimated Location bound a location area that is preferably used to determine a set of estimated nearby routers within the area. When a source node wishes to send a signal or packet to a mobile silent node with available waypoint information, the source node first consults a current time (S10). The source node determines if the current time falls within the start and stop time for one of the silent node's waypoints (S11). If the current time falls within such an interval, the source node calculates the Limits in Estimated Location for this node's geographic location at that waypoint (S12). For example, these Limits can be determined using a radio receive range, a derated radio receive range centered at the waypoint, a predetermined area, RF propagation techniques, and so forth. If the current time does not fall within such an interval, the source node determines whether the current time is after a departure time for the last waypoint (S13). If the current time is not after such departure time, the source node calculates the Limits for a traversal path from the previous waypoint to the next waypoint (S14), as discussed above. If the current time is after the departure of the last waypoint identified in the routing update message, the Limits are calculated in step S15 based on the last known waypoint location with an unknown trajectory, as described above (e.g., via a known velocity and elapsed time). The source node uses the Limits that it has calculated to define a location area from which a set of estimated nearby routers is selected, as discussed above with reference to FIG. 4, for example steps S2–S9. The source node then multicasts a message to this set of routers, as in the procedures discussed above.

Waypoint information, an initial geographic location, and velocity information may be included in initial network configuration data instead of, or in addition to, routing trajectory updates. Initially providing this information accommodates nodes that are always silent, e.g., nodes that have no opportunity to inject their own trajectory information into the network as routing updates.

Preferably, trajectory routing update messages are superceded by "normal" routing update messages. To illustrate, a node that was in radio silence, but is now reemerging from radio-silence, is considered (e.g., a node that is now able to turn on its transmitter and rejoin the network). As part of this process the reemerging node may create and disseminate a "normal" routing update that indicates how this node can be reached through the network. For example, the reemerging node may distribute an update containing a neighbor list, current affiliations, node ID, and/or so forth. This normal update will preferably supercede the trajectory message, for example, because it has a newer message sequence number. At this point, messages will begin to flow toward the reemerging node in a conventional manner, instead of under the procedures for routing to a silent node as described herein.

The present invention has been described with respect to a system implemented in a distributed fashion, e.g., by flooding routing updates and trajectory messages among all the routers in the network. As an alternative arrangement, the system can be implemented in a centralized form, in which all trajectory updates are routed to a central server (e.g., a server linked to a router). The central server can be a conventional server, having known processing, memory and communications components. The central server can then calculate Limits in Estimated Locations, determine location areas, determine sets and/or subsets of estimated nearby routers, and so forth. Network nodes that need to find a silent node can then query the central server for required multicast information. Alternatively, the system can be implemented in a semi-distributed form, in which redundant groups of nodes know trajectory information rather than a strictly centralized system. These redundant nodes can then be queried by other network nodes to obtain the relevant information.

The individual components shown in outline or designated by blocks in the figures are all well known in the communication arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, as will be appreciated by those skilled in the art, the methods, procedures, lists, message formats, data structures, and logic as described herein, can be readily embodied in a programmable computer or in computer executable software using known programming techniques. The software can be stored on a computer readable medium, for example, on a floppy disk, RAM, ROM, a hard disk, removable media, flash memory, data caches, memory sticks, optical mediums, magneto-optical mediums, CD-ROMs, etc.

As will also be appreciated by those skilled in the art, the specific network configurations shown in the figures in no way limit the scope of the present invention. Other possible configurations may include a different number of total network nodes, different network connections, a different radio-silent node, multiple radio-silent nodes, a different number of cluster heads, cluster members and/or affiliation connections, multiple cluster-member to cluster head affiliations, cluster-member to cluster-member messaging, and so forth.

Figure 7:
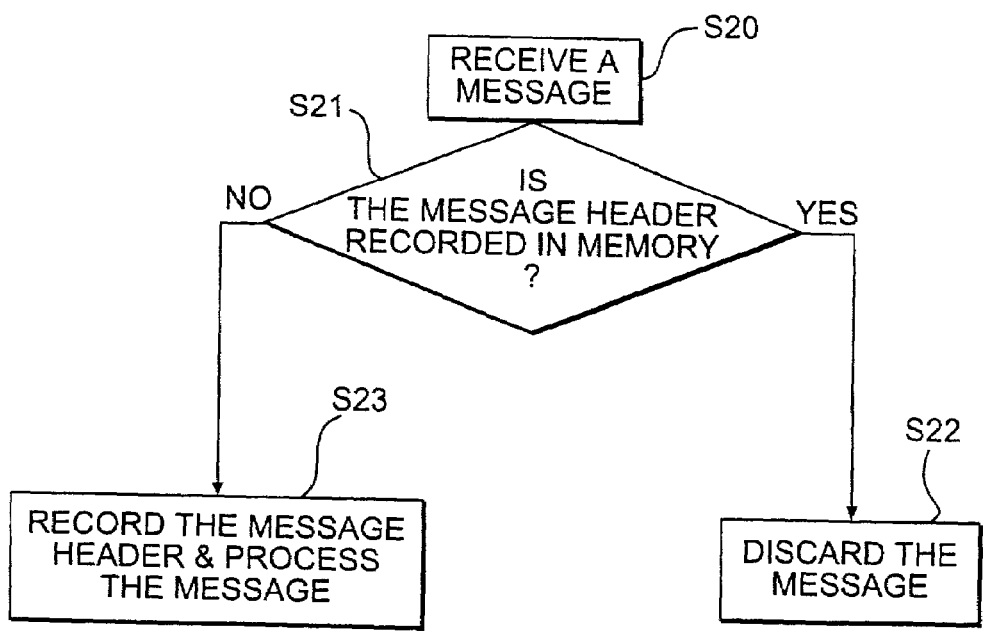
FIG. 7 is a flow diagram illustrating a packet reception procedure for a silent node.

Also, the sample message format shown in FIG. 6 and the procedure shown in FIG. 7 apply to all messages sent via multicast routing. For example, they apply regardless of whether a location of a silent node is known or whether the silent nodes is moving under a planned trajectory or is moving at a unknown velocity in an unknown direction.

As will be readily appreciated by those skilled in the art, the present invention applies to an ad-hoc network having member stations arranged in clusters. One application, for example, is for cluster heads to operate as routers, with the above procedures applying to the cluster heads. Also a cluster member station may become radio-silent and messages for the silent cluster member may be sent to particular clusters within a location area for redistribution to the silent cluster members. The cluster head and/or cluster members could retransmit the message in hopes that the silent cluster member would hear the message.

What is claimed is:

1. A communications router for use in a communications network including a plurality of routers, the network having at least one radio-silent communications node which can receive messages, said communications router including a transceiver to transmit and receive messages, said communications router comprising:
   an electronic memory circuit having network information stored therein; and
   an electronic processor circuit which (i) determines a location area corresponding to the radio-silent node based on a maximum velocity of the radio-silent node and an elapsed time since the radio-silent node was known to be at an initial position, (ii) formulates a message for the radio-silent node, (iii) determines a set of routers located within the location area, and (iv) directs a transmission of the message to the set of routers for retransmission for the radio-silent node.

2. A communications router for use in a communications network including a plurality of routers, the network having at least one radio-silent communications node which can receive messages, said communications router including a transceiver to transmit and receive messages, said communications router comprising:
an electronic memory circuit having network information stored therein; and
an electronic processor circuit which (i) determines a location area corresponding to the radio-silent node based on a planned trajectory of the radio-silent node which includes at least one waypoint and a time at which the radio-silent node plans to be in the at least one waypoint, (ii) formulates a message for the radio-silent node, (iii) determines a set of routers located within the location area, and (iv) directs a transmission of the message to the set of routers for retransmission for the radio-silent node.

3. A communications router for use in a communications network including a plurality of routers, the network having at least one radio-silent communications node which can receive messages, said communications router including a transceiver to transmit and receive messages, said communications router comprising:
an electronic memory circuit having network information stored therein; and
an electronic processor circuit which (i) determines a location area corresponding to the radio-silent node, the location area comprises a circle having a center at a last known position of the radio-silent node and a radius equal to a communications range of the radio-silent node, (ii) formulates a message for the radio-silent node, (iii) determines a set of routers located within the location area, and (iv) directs a transmission of the message to the set of routers for retransmission for the radio-silent node.

4. A communications router for use in a communications network including a plurality of routers, the network having at least one radio-silent communications node which can receive messages, said communications router including a transceiver to transmit and receive messages, said communications router comprising:
an electronic memory circuit having network information stored therein; and
an electronic processor circuit which (i) determines a location area corresponding to the radio-silent node, the location area comprises a circle having a center at a last known position of the radio-silent node and a radius smaller than a communications range of the radio-silent node, (ii) formulates a message for the radio-silent node, (iii) determines a set of routers located within the location area, and (iv) directs a transmission of the message to the set of routers for retransmission for the radio-silent node.

5. In a communications system for communications among a plurality of routers in a network, the network having at least one radio-silent node which can receive messages, each of the communication routers including a transceiver to transmit and receive messages, a method of operating a first router of the plurality of routers comprising the steps of:
determining a location area corresponding to the radio-silent node based on a maximum velocity of the radio-silent node, and an elapsed time since the radio-silent node was known to be at an initial position;
formulating a message for the radio-silent node;
determining a set of routers located within the location area; and
directing the message to the set of routers for retransmission for the silent node.

6. In a communications system for communications among a plurality of routers in a network, the network having at least one radio-silent node which can receive messages, each of the communication routers including a transceiver to transmit and receive messages, a method of operating a first router of the plurality of routers comprising the steps of:
determining a location area corresponding to the radio-silent node based on a planned trajectory of the radio-silent node which includes at least one waypoint and a time at which the radio-silent node plans to be in the at least one waypoint;
formulating a message for the radio-silent node;
determining a set of routers located within the location area; and
directing the message to the set of routers for retransmission for the silent node.

7. In a communications system for communications among a plurality of routers in a network, the network having at least one radio-silent node which can receive messages, each of the communication routers including a transceiver to transmit and receive messages, a method of operating a first router of the plurality of routers comprising the steps of:
determining a location area corresponding to the radio-silent node;
formulating a message for the radio-silent node;
determining a multicast forwarding tree, based on the first router, whose end points comprises the set of routers;
determining a set of routers located within the location area; and
directing the message throughout the network according to the multicast forwarding tree to the set of routers for retransmission for the silent node.

8. In a communications system for communications among a plurality of routers in a network, the network having at least one radio-silent node which can receive messages, each of the communication routers including a transceiver to transmit and receive messages, a method of operating a first router of the plurality of routers comprising the steps of:
determining a location area corresponding to the radio-silent node, wherein the location area comprises a circle having a center at a last known position of the radio-silent node and a radius equal to a communications range of the radio-silent node;
formulating a message for the radio-silent node;
determining a set of routers located within the location area; and
directing the message to the set of routers for retransmission for the silent node.

9. In a communications system for communications among a plurality of routers in a network, the network having at least one radio-silent node which can receive messages, each of the communication routers including a transceiver to transmit and receive messages, a method of operating a first router of the plurality of routers comprising the steps of:
determining a location area corresponding to the radio-silent node, wherein the location area comprises a circle having a center at a last known location of the radio-silent node, the circle having a radius smaller than a communications range of the radio-silent node;
formulating a message for the radio-silent node;
determining a set of routers located within the location area; and
directing the message to the set of routers for retransmission for the silent node.

10. In a communications system for communications in a network among a plurality of wireless nodes, the network including at least one radio-silent node capable of receiving network messages, each of the nodes includes a transceiver to transmit and receive messages, a method of operating the network comprising the steps of:
formulating a message for the radio-silent node in a first node of the plurality of nodes;
determining a location area of the radio-silent node;
defining a multicast routing group comprising a set of the plurality of nodes including at least one node within the location area;
multicasting the message from the first node to the multicast routing group, wherein each node of the multicast routing group that receives the message retransmits the message for the radio-silent node;
receiving a copy of the message in the radio-silent node, wherein the message comprises a node sender sequence number and a node identifier of the first node;
storing the node sender sequence number and node identifier in memory when the copy is the first received copy; and
disregarding the message when the copy is not the first received copy.

11. In a communications system for communications in a network among a plurality of wireless nodes, the network including at least one radio-silent node capable of receiving network messages, each of the nodes includes a transceiver to transmit and receive messages, a method of operating the network comprising the steps of:
formulating a message for the radio-silent node in a first node of the plurality of nodes;
determining a location area of the radio-silent node;
defining a multicast routing group comprising a set of the plurality of nodes including at least one node within the location area;
multicasting the message from the first node to the multicast routing group, wherein each node of the multicast routing group that receives the message retransmits the message for the radio-silent node;
receiving a copy of the message in the radio-silent node, wherein the message comprises a node sender sequence number and a node identifier of the first node;
identifying the node sender sequence number and the node identifier from the message copy;
determining if the node sender sequence number and node identifier are stored in a memory; and
processing the message and storing the node sender sequence number and node identifier in the memory when said determining step determines that the node sender sequence number and node identifier have not been previously stored.

12. The method according to claim 11, further comprising a step of disregarding the message when the node sender sequence number and node identifier have been previously stored.

13. In a communications system for communications in a network among a plurality of wireless nodes, the network including at least one radio-silent node capable of receiving network messages, each of the nodes includes a transceiver to transmit and receive messages, a method of operating the network comprising the steps of:
formulating a message for the radio-silent node in a first node of the plurality of nodes;
determining trajectory information of the radio-silent node, the trajectory information including a plurality of waypoints and an associated arrival and departure time for each waypoint;
consulting a current time;
calculating a location area by (i) determining whether the current time falls within a time interval associated with any of the plurality of waypoints, and centering a location area at a waypoint when the current time is within the time interval associated with the waypoint, (ii) calculating a location area between a first and second waypoint when the current time is between a departure time of the first waypoint and an arrival time of the second waypoint, the location area comprising a transversal path between the first and second waypoints, and (iii) determining a location area of the radio-silent node based on a velocity of the radio-silent node and an elapsed time since leaving a last identified waypoint when the current time is later than a departing time for the last identified waypoint;
defining a multicast routing group comprising a set of the plurality of nodes including at least one node within the location area; and
multicasting the message from the first node to the multicast routing group, wherein each node of the multicast routing group that receives the message retransmits the message for the radio-silent node.

14. In a communications system for communications among a plurality of routers in a network, the network having at least one radio-silent node which can receive messages, a planned trajectory of the radio-silent node being available to the plurality of routers, the planned trajectory including a plurality of waypoints and at least one time associated with each waypoint, a method of transmitting a message to the radio-silent node comprising the steps of:
determining an estimated location of the radio-silent node based on the plurality of waypoints and respective associated times;
determining a set of routers comprising at least one router within the estimated location; and
performing multicast routing of the message to the set of routers, the message to be broadcast by the set of routers for the radio-silent node.

15. A method of estimating a location area of a radio-silent node in an ad-hoc network including a plurality of nodes, the method comprising the steps of:
determining an initial position of the radio-silent node; and
calculating a location area for the radio-silent node, the location area centered at the initial position and having a radius equal to a maximum velocity of the radio-silent node multiplied by an elapsed time since the radio-silent node was known to be at the initial position.

16. A method of estimating a location area of a radio-silent node in an ad-hoc network including a plurality of nodes, the method comprising the steps of:
determining an advertised position of the radio-silent node; and
calculating a location area for the radio-silent node based on the advertised position, at least in part by evaluating geographic location indicators for the radio-silent node and at least one time for each indicator.

17. A method of estimating a location area of a radio-silent node in an ad-hoc network including a plurality of communication nodes, the network including trajectory information for the radio-silent node, the trajectory information including a velocity indicator for the radio-silent node, a plurality of waypoints, and an arrival and a departure time associated with each waypoint, each of the plurality of waypoints comprising a geographic location, the method comprising the steps of:

determining a current time;

calculating an estimated location area having a center at a geographic location of a waypoint when the current time falls within the arrival and departure times associated with the waypoint;

calculating an estimated location area comprising a transversal path between a first waypoint and a second waypoint when the current time falls between the departure time of the first waypoint and the arrival time of the second waypoint; and calculating an estimated location area centered at a last waypoint, the area having a radius extending a distance from the last waypoint to a distance equal to the velocity indicator multiplied by the elapsed time since the departure time associated with the last waypoint, when the current time is later than the departure time associated with the last waypoint.

18. A method of transmitting a message from a first node to a mobile radio-silent node in a network including a plurality of nodes, the method comprising the steps of:

determining a location area corresponding to the radio-silent node including determining a radius of an area centered at an initial position of the radio-silent node by multiplying a velocity of the radio-silent node with an elapsed time since the radio-silent node was known to be at the initial position;

identifying a set of nodes located within the location area; and transmitting a message from the first node for distribution to the set nodes, wherein each node of the set of nodes that receives the message broadcasts the message for the radio-silent node.

19. A method of transmitting a message from a first node to a mobile radio-silent node in a network including a plurality of nodes and a trajectory of the radio-silent node, the trajectory including at least one planned geographic location and at least one time associated with the at least one planned geographic location, the method comprising the steps of:

determining a location area corresponding to the radio-silent node using the at least one planned geographic location and the associated time;

identifying a set of nodes located within the location area; and transmitting a message from the first node for distribution to the set nodes, wherein each node of the set of nodes that receives the message broadcasts the message for the radio-silent node.

20. A method of transmitting a message from a first node to a radio-silent node in a network including a plurality of nodes, the method comprising the steps of:

determining a location area corresponding to the radio-silent node, the location area comprising a radius equal to a radio receive range of the radio-silent node plus a distance equal to a velocity of the radio-silent node multiplied by an elapsed time since the radio silent node was at an initial position;

identifying a set of nodes located within the location area; and transmitting a message from the first node for distribution to the set nodes, wherein each node of the set of nodes that receives the message broadcasts the message for the radio-silent node.

21. A data structure of a trajectory routing message for a communications node in a network having a plurality of nodes, the data structure being stored on a computer readable medium, said data structure comprising:

an originating node identifier;

a message sequence number;

at least one waypoint including a geographic identifier and at least one time associated with the at least one waypoint; and a velocity indicator of the communications node.

22. A method of formulating a trajectory routing message for a communications station that communicates among a plurality of similar stations in a network, the method comprising the steps of:

providing an originating node identifier and a message sequence number; and providing a plurality of geographic location identifiers and at least one associated time for each identifier.

23. In a communications system for communications among a plurality of routers in a network, each router being capable of operating as a radio-silent node, wherein a radio-silent node is adapted to receive messages from the network, each of the communications routers including a transceiver to transmit and receive messages, a method of operating the network comprising the steps of:

generating and transmitting a trajectory message in a first router when the first router operates as a router, the message including planned trajectory information, a node identifier and a sequence number; and disregarding, in the first router when operating as a radio-silent node, duplicate copies of a received message.

24. A method according to claim 23, wherein after the first node emerges from operating as a silent node, the method comprises a step of flooding a routing update from the first node through the network.

25. A method according to claim 24, wherein the routing update takes priority over the trajectory message.

26. In a communications system for communications in a network among a plurality of wireless stations, the network including at least one silent station, each of the stations including a transceiver to transmit and receive messages, a method of operating a network comprises the steps of:

determining planned trajectory information for each node in the network; and providing the planned trajectory information to each node in the network.

27. The method according to claim 26, wherein the planned trajectory information is provided as network configuration data, and wherein the planned trajectory information includes waypoints having an associated arrival and departure time, and a velocity indicator of the radio-silent station.

28. The method according to claim 26, wherein the planned trajectory information is provided as a routing update, wherein the planned trajectory information includes waypoints having an associated arrival and departure time, and a velocity indicator of the radio-silent station.

29. The method according to claim 26, wherein said determining step is preformed in a central server.

30. The method according to claim 29, wherein the central server computes a location area for the radio-silent station and determines which out of the plurality of stations are nearby the radio-silent station.

31. A mobile communications station which communicates among a plurality of mobile stations in an ad-hoc network in which stations are arranged in clusters of communication member stations, with one member station in each cluster being a head station for the cluster, each member station communicating with the network through at least one cluster head station, a cluster head station communicating with zero or more cluster head stations, the network including at least one radio-silent cluster member, said mobile station including a transceiver which transmits signals to and receives signals from mobile stations in the network, said mobile communications station comprising:

- a memory having network information stored thereon; and
- a processor which (i) operates said mobile station as a cluster head or cluster member station; (ii) determines a location area of the silent cluster member, (ii) formulates a message to be transmitted to the silent cluster member, (iii) determines a set of mobile stations corresponding to the location area of the silent cluster member, and (iv) causes said mobile communications station to transmit the message for distribution to the set of nearby mobile stations.

* * * * *